May 1, 1934.  E. D. TILLYER  1,957,116
OPHTHALMIC LENS
Filed June 19, 1933
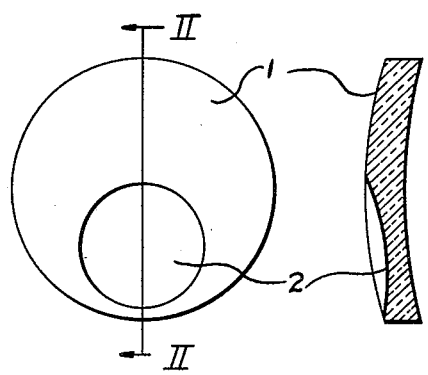
FIG.I   FIG.II
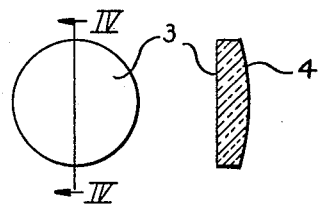
FIG.III   FIG.IV
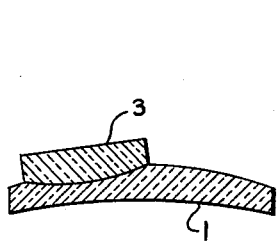
FIG.V
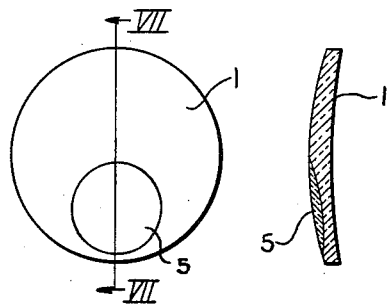
FIG.VI   FIG.VII
INVENTOR
Edgar D. Tillyer.
BY
Harry H. Styll
ATTORNEY Patented May 1, 1934

1,957,116

UNITED STATES PATENT OFFICE 1,957,116

OPHTHALMIC LENS

Edgar D. Tillyer, Southbridge, Mass., assignor to American Optical Company, Southbridge, Mass., a voluntary association of Massachusetts Application June 19, 1933, Serial No. 676,484

2 Claims. (Cl. 88—54)

This invention relates to ophthalmic lenses, and more particularly to a bifocal or multifocal lens having a major portion of inexpensive optical crown glass and a minor portion of a glass of a different index of refraction stably fused therewith, said lens being substantially color-free, and to an improved method of making the same.

This application is a continuation in part of my application Serial Number 628,187 filed August 10, 1932.

The principal object of the invention is to produce a fused multifocal or bifocal lens that will be substantially color-free, utilizing a major portion of inexpensive optical crown glass and a minor portion of different index of refraction that will fuse stably therewith without cracking or warping.

Other objects of the invention are to provide glasses for the two parts of a good white color that will have expansion factors related for good fusing, reciprocal relative dispersions related for good color properties, and that will be resistant to tarnish and corrosion from use or age, and that will possess the properties of being resistant to injurious chemical changes and crystallization during the fusion operations.

Other objects and advantages will become apparent from the following description taken in connection with the accompanying drawing, and it will be apparent that many changes may be made in the details of construction and arrangements of parts and steps of the process without departing from the spirit of the invention as expressed in the accompanying claims. I therefore do not wish to be limited to the exact details shown and described as the preferred forms only have been shown by way of illustration.

Referring to the drawing:

Figure I is a view of the seat side of the major blank used in forming the lens used by way of illustrating this invention;

Figure II is a cross section of Figure I taken along the line II—II thereof;

Figure III is a view of one face of the button or minor portion used in forming the reading segment or portion of this lens;

Figure IV is a cross section of Figure III taken along the line IV—IV thereof;

Figure V is a cross section showing the major blank with the segment or minor portion in position on the seat.

Figure VI is a view showing the bifocal or segment side of the blank after it has been finished off;

Figure VII is a cross section of Figure VI taken along the line VII—VII thereof.

Formerly bifocal or multifocal lenses of the fused type have been made from major blanks of crown glass having an index of refraction of about 1.52 and a reciprocal relative dispersion of about 55 to 59, and a minor portion of a glass having an index of refraction of about 1.61 and a reciprocal relative dispersion of about 52 to 55. These glasses were both special glasses averaging in cost about four times the cost of the ordinary silicate crown glass of the prior art having an index of refraction of about 1.52 and a reciprocal relative dispersion of about 58. While these lenses were of good quality as regards their color properties, the glass used was exceedingly expensive. There was, however, some trouble with these glasses in that they had a tendency to tarnish and corrode from use or age. When it was attempted to fuse the minor portion glass with the ordinary silicate crown of the prior art it was found that the two glasses would not fuse together due to their expansion factors. It is, therefore, a principal object of my invention to overcome these disadvantages by using an inexpensive crown glass of good white color and resistant to tarnish and corrosion, in combination with a minor portion glass that will fuse with it without warping or cracking and which will be of good color, resistant to tarnish, corrosion, crystallization, and injurious chemical change, and so related as regards its reciprocal relative dispersion as to insure good color properties in the composite lens.

Referring now more particularly to the drawing, there is shown in Figure I a major blank 1 having a circular seat 2 formed thereon. This seat is usually formed with a spherical bottom surface as shown in Figure II. In the lens of this invention this major blank will be made of an inexpensive optical silicate crown lens glass.

The composition of this glass is about as follows:

| | |
|---|---|
| $SiO_2$ | 71.6 |
| $Na_2O$ | 11.6 |
| $K_2O$ | 2.5 |
| $CaO$ | 11.5 |
| $Sb_2O_5$ | 1.0 |
| $Na_2SO_4$ | 0.8 |
| $Al_2O_3$ | 1.0 |

The index of refraction of this glass is about 1.5. The reciprocal relative dispersion is from about 54 to 59.

The expansion factor is such that the glass will successfully and stably fuse without warping or cracking with the glass of the segment or minor portion to be described later, as well as with the flints previously used.

In Figures III and IV there is illustrated the button or minor portion segment insert 3 which is to be fused into the seat 2. As shown, a curve 4 is usually imparted to one face of the button 3 so that it will substantially fit the curve of the seat.

The part 3 is shown in Figure V in position on the seat in the major blank, and it is to be understood that it is secured in this position, preferably by fusing.

After the button or part 3 has been secured in place the front or button side of the lens is finished off to a continuous curve over the button and the major lens leaving the reading segment 5 embedded in the major lens as shown in Figures VI and VII. The opposite side is finished off to an optical surface to produce the required prescriptive power in the finished lens.

As will be readily appreciated, the first requirement, where the parts are to be fused together, is that the coefficients of expansion of the two parts are so related that there will be no internal strains in the finished lens, but that the two parts will fuse together in stable relation without warping or cracking. The second requirement in order to have a practically color-free lens, is that the minor portion have a suitable dispersion factor as related to the dispersion factor of the major portion.

When the dispersion factor is maintained at about 54 or higher, as in the prior art barium crown glass, it is difficult and expensive to obtain an expansion factor of proper relation to that of the crown glass. However, it has been found that if a slightly lower dispersion factor of about 48 to 54 is used the proper expansion factor can be readily and cheaply obtained. A glass can then be produced which will have the proper index of refraction and which will stably fuse with an inexpensive optical crown major blank without warping. While this glass will have a slightly greater tendency to produce color than the barium crown glass previously used, it has been found that the difference is practically unnoticeable. It has also been found that glass produced in this way, when combined with an inexpensive optical crown lens glass, produces a stable combination which does not have any tendency to crack apart, warp, or to discolor, and is free from crystallization and from injurious chemical changes due to fusion.

The composition of a glass for the button portion which I have used with good results is:

| | |
|---|---|
| $SiO_2$ | 40.9 |
| $Na_2O$ | 3.7 |
| $K_2O$ | 2.7 |
| $BaO$ | 29.1 |
| $PbO$ | 8.0 |
| $CaO$ | 3.9 |
| $ZnO$ | 2.3 |
| $Sb_2O_3$ | 1.8 |
| $B_2O_3$ | 2.7 |
| $Fe_2O_3$, $TiO_2$ | 0.5 |
| $Al_2O_3$ | 0.4 |

The index of refraction is about 1.6, the reciprocal relative dispersion is about 49 to 54. The expansion factor is such that the glass fuses successfully and stably with the crown glass used and described above.

The softening point of this button glass is sufficiently lower than that of the said crown glasses to insure fusion without warping of the major blank which would destroy the curve of the seat.

The button glass of this optical composition, that is, refractive index of about 1.6 and a reciprocal relative dispersion of about 49 to 54 can be made stable, which means freedom from corrosion, tarnish, crystallization and cracking in use.

It has been found from experience that a bifocal lens made of these glasses, that is, glasses having these optical properties, makes a good reduced color lens free from defects of warping, crystallization, cracking, and corrosion, the inherent disadvantages of using expensive special glasses, and with good fusing and color properties not hitherto obtainable.

It has been found from experience that by a reduction of the reciprocal relative dispersion from its previous value of from 55 to 59 to about 48 to 54, as stated herein, there are a relatively large number of glass compositions which can be economically manufactured for a button glass that will fuse with the said crown glass or similar glass, without crystallization and cracking and being satisfactory as to its softening point, its expansion factor, its color, its resistance to tarnish, and its ability to fuse together with crown without chemical change and without a grayish or milky deposit on the interface, which were defects in the prior art structures.

It is desirable in the button glass to keep the reciprocal relative dispersion in a range of about 48 to 54. Even lower than 48 may be used for cheapening the glass with a decided improvement over the old flint with a reciprocal relative dispersion of about 36, and an index of refraction of 1.61.

If it is desired to do so, it is possible to raise the index of refraction from 1.61 to 1.65 and get a reciprocal relative dispersion of about 45 instead of the old flint having an index of refraction of 1.65 and a reciprocal relative dispersion of about 34. It is also possible to raise the index of refraction of the button glass still higher if the reciprocal relative dispersion is lowered and still keep a better glass combination than the high index flint of 1.70 with a reciprocal relative dispersion of about 32. In general, by a slight reduction in the reciprocal relative dispersion of the button glass, a great improvement can be made in equalizing the expansions of the parts, making for economy and stability in the fusing, together with a satisfactory reduced color lens that is more resisting to discoloration, which has been a troublesome defect in prior art lenses bringing about an exceedingly high percentage of wastage and commercial loss.

According to this invention, therefore, the button insert 3 is preferably formed of glass having a dispersion factor which will permit the expansion factor required to be obtained in an inexpensive glass for the major part.

The glass for the major portion of the lens differs from the prior art silicate crown glass in that it has a whiter color obtained by a reduction in the iron content of the prior art glass which has been done without materially increasing the cost.

The glass for the minor portion of my lens is a new glass specially designed for the combination of my invention, which combination and the results obtained are new in my invention so far as I am aware.

Consideration has been given the following characteristics of the lenses in producing this combination of glasses and the resultant lenses:

Whiter color, by a reduction of iron content of the major glass, reduction of reciprocal relative dispersion by increased lead content, expansion factor by the general chemical combination, avoidance of tarnish by zinc and lead content and a relatively low percent of alkalies, crystallization by the general chemical combination.

The combination of glasses used for the purposes specified is new and it produces results not hitherto obtained. I have been enabled to obtain the results of my invention with the new combination of glasses used by compromising the reciprocal relative dispersion of the button portion by slightly lowering it, with the expansion factor of said button portion so that it will be substantially equal to that of the major portion and will stably fuse with it, and thus permit me to use an inexpensive crown glass major portion in a stable combination.

It will be appreciated that if some other glass possessing the desired qualities of refraction, dispersion, cost, etc., should become available for use in the major blanks, it would fall within the spirit of this invention to use such glass and to vary the expansion characteristics of the button insert glass until the two parts could be fused together.

From the foregoing it will be seen that I have provided an inexpensive crown glass for the major portion that differs from the expensive crown glass of the prior lenses, said glass having substantially the same index of refraction as the prior glass, and that I have provided a glass for the minor portion that will stably fuse with the major portion and will have substantially the same index of refraction as the prior lenses but will have a reciprocal relative dispersion lying between 48 and 54 instead of about 55. I have been able to obtain the economy in these lenses without reducing the color properties of the lenses to any substantial perceptible amount.

I have been able to obtain this improvement by starting with my inexpensive crown major portion and then providing a minor portion that will have the necessary expansion factor for good fusion, will be resistant to tarnish and corrosion, and to crystallization and injurious chemical changes, by reducing the reciprocal relative dispersion thereof, and yet maintaining the said dispersion within limits that will not substantially change the color properties of the resultant lens.

It will be seen that the objects set forth and the advantages of the invention are obtained, and that there is set forth a lens which will be practically color-free, which will not have a tendency to crack apart, warp, nor to become discolored, and the major portion of which may be made from an inexpensive glass, as well as an improved process for obtaining these results.

Having described my invention, I claim:

1. A multifocal or bifocal lens comprising a major portion of glass having a recessed portion therein, said recessed surface being finished to an optical surface and a minor lens portion of a glass of different refractive index fused in said recess, said major glass being a silicon, sodium, calcium optical crown glass containing approximately about 71 per cent silicon oxide, 12 per cent sodium oxide, and 11 per cent calcium oxide and small percentages of the oxides of potassium and antimony, and having a refractive index of about 1.5 and a reciprocal relative dispersion of about 54 to 59, and said minor glass being a silicon, barium glass having approximately about 40 per cent of oxide of silicon and 29 per cent of barium oxide with a small percentage of the oxides of lead, zinc, antimony and boron and having an index of refraction of about 1.6 and a reciprocal relative dispersion of about 49 to 54 and said two glasses having substantially the same expansion factor so they will stably unite on fusion.

2. A multifocal or bifocal lens comprising a major portion of glass having a recessed portion therein, said recessed surface being finished to an optical surface and a minor lens portion of a glass of different index of refraction fused in said recess, said major glass comprising in combination the following ingredients in approximately the percentages specified, $SiO_2$, 71 per cent; $Na_2O$, 12 per cent; $K_2O$, 2½ per cent; $CaO$, 11½ per cent; $Sb_2O_5$, one per cent; $Al_2O_3$, about one per cent or less, and having a refractive index of about 1.5 and a reciprocal relative dispersion of about 54 to 59, and said minor lens comprising in combination the following ingredients in approximately the percentages specified, $SiO_2$, 40 per cent, $Na_2O$, 4.0 per cent, $K_2O$, 2 per cent, $BaO$, 29 per cent, $PbO$, 7 per cent, $ZnO$, 3 per cent, $Sb_2O_3$, 1½ per cent, $B_2O_3$, 3 per cent, $Fe_2O_3$, ½ per cent, $Al_2O_3$, ½ per cent, and having an index of refraction of about 1.6 and a reciprocal relative dispersion of about 49 to 54, and said two glasses having substantially the same expansion factor so they will stably unite on fusion.

EDGAR D. TILLYER.